No. 12,782. REISSUED APR. 21, 1908.

M. LANDRY.

ELECTRIC HEATER.

APPLICATION FILED FEB. 6, 1908.

WITNESSES

Alex Burns

Amy Medina

INVENTOR

Moise Landry

BY

Medina & Griffin

ATTORNEYS

THE NORRIS PETERS CO., WASHINGTON, D. C.

UNITED STATES PATENT OFFICE.

MOÏSE LANDRY, OF SAN FRANCISCO, CALIFORNIA.

ELECTRIC HEATER.

No. 12,782. Specification of Reissued Letters Patent. Reissued Apr. 21, 1908.

Original No. 873,317, dated December 10, 1907, Serial No. 364,748. Application for reissue filed January 20, 1908. Serial No. 414,662.

*To all whom it may concern:*

Be it known that I, MOÏSE LANDRY, a citizen of Canada, residing in the city and county of San Francisco, State of California, have invented certain new and useful Improvements in Electric Heaters, of which the following is a specification.

The object of my invention is to provide an electric heater adapted for various heating and warming purposes, in which the heating element is a high resistance wire or wires adapted to carry electricity in current form, in which the heating wire may be readily rewound when damaged, and which shall be safe from electrical contact with external bodies.

Figure 1:
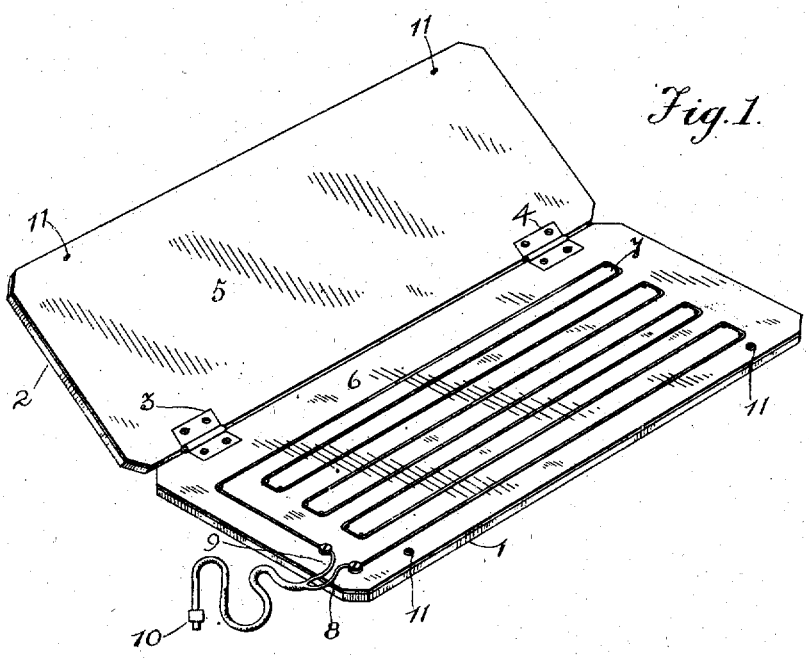
Figure 2:
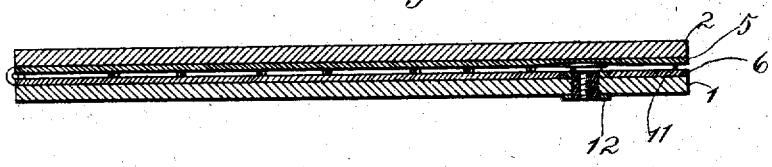

I attain my objects by the means illustrated in the accompanying drawing, of which Figure 1 is a perspective view of my electric heater; and Fig. 2 a cross-sectional view thereof on enlarged scale, showing inner arrangement of parts.

The same numeral of reference refers to the same part in both the views.

I provide two boards 1, 2 hinged together as at 3, 4. These boards are made of a thinness sufficient to secure what rigidity may be desired while allowing the transmission of the desired amount of heat therethrough. The inner surfaces of said boards are covered with asbestos, 5, 6, secured thereto in any convenient manner.

On the surface of the asbestos covering, and arranged so as to lie between the upper and lower covering when the boards are closed on hinges aforesaid, I provide convolutions of high resistance wire, secured in any suitable manner, as by the pegs shown. The length of this wire and its size are determined by the degree of heat required, and the electromotive force of the source of electrical energy; and as the arrangement of the boards on hinges to give ready access to said wire facilitates the changing thereof to meet the requirements of various electromotive forces attention is particularly called to this feature of my invention. The ends of said wire I lead through insulated wires 8, 9, to a plug 10, or other suitable connecting device. Catches 11 are arranged to hold the hinged boards closed. When the plug 10, is attached to a source of electrical current of suitable strength wire 7 is heated; the asbestos covering prevents the wooden parts from being burned; and through the asbestos and wooden covering the heat is distributed to adjacent bodies.

The hinged boards present a ready means for uncovering the wire 7 for repair and rewinding; while they give a rigidity and stiffness to the device adapting it to various purposes for which a pad would be unsuited.

The screw threaded nut 12 is of insulating material.

I claim

1. An electric heater comprising two boards hinged together, an asbestos covering on the inner surfaces of said boards and a high resistance wire arranged to lie between said coverings when said boards are closed.

2. An electric heater comprising two boards hinged together, an asbestos covering on the inner surfaces of said boards, a high resistance wire arranged to lie between said coverings when said boards are closed, means for securing said boards in their closed position, and means for supplying current to said wire.

3. In an electric heater, the combination with insulating and heating elements of a pair of boards hinged together and being provided with suitable clasps for securing them in closed position, for inclosing the said insulating and heating elements and allowing them to be readily handled.

In testimony whereof I have hereunto signed my name in the presence of two witnesses.

MOÏSE LANDRY.

Witnesses:
FRANK P. MEDINA,
E. G. MEDINA.